(12) United States Patent
McLaughlin et al.

(10) Patent No.: US 7,451,967 B2
(45) Date of Patent: Nov. 18, 2008

(54) SPLIT OUTER TUBE ANTI-WALKOUT BUSHING

(75) Inventors: Ronald J. McLaughlin, Maumee, OH (US); Jeff Raymond, Bellevue, OH (US)

(73) Assignee: The Pullman Company, Milan, OH (US)

( * ) Notice: Subject to any disclaimer, the term of this patent is extended or adjusted under 35 U.S.C. 154(b) by 117 days.

(21) Appl. No.: 11/342,928

(22) Filed: Jan. 30, 2006

(65) Prior Publication Data

US 2006/0186590 A1      Aug. 24, 2006

Related U.S. Application Data

(60) Provisional application No. 60/655,752, filed on Feb. 24, 2005.

(51) Int. Cl.
    *F16F 7/00* (2006.01)
(52) U.S. Cl. ............... 267/141.2; 267/293; 267/140.12
(58) Field of Classification Search .......... 267/293, 267/141.2, 141.6, 140.12
    See application file for complete search history.

(56) References Cited

U.S. PATENT DOCUMENTS

| | | | | |
|---|---|---|---|---|
| 2,659,619 | A | * | 11/1953 | Kishline et al. ............. 267/293 |
| 5,413,374 | A | * | 5/1995 | Pierce ................. 280/124.177 |
| 5,437,439 | A | * | 8/1995 | Brokamp et al. ............. 267/293 |
| 6,430,774 | B1 | | 8/2002 | McLaughlin et al. |
| 6,513,801 | B1 | * | 2/2003 | McCarthy .................... 267/293 |
| 6,854,723 | B2 | * | 2/2005 | Ogawa et al. ................ 267/293 |
| 2006/0125165 | A1 | * | 6/2006 | Niwa et al. .................. 267/293 |

* cited by examiner

*Primary Examiner*—Robert A Siconolfi
*Assistant Examiner*—Mariano Sy
(74) *Attorney, Agent, or Firm*—Harness, Dickey & Pierce, PLC

(57) ABSTRACT

A pivot bushing for a suspension system has an inner metal and a split outer metal with an elastomeric bushing disposed between the metals. The split outer metal has one end which is partially closed by an inwardly curved portion and one end which is open. The assembly of the bushing is through the open end. Once assembled the open end is closed by placing a cover over the open end and crimping the cover to a flange formed at the open end. In another embodiment, the cover is inserted into the outer metal and the split outer metal is crimped to secure the cover in place.

18 Claims, 3 Drawing Sheets

SPLIT OUTER TUBE ANTI-WALKOUT BUSHING

CROSS-REFERENCE TO RELATED APPLICATIONS

This application claims the benefit of U.S. Provisional Application No. 60/655,752, filed on Feb. 24, 2005. The disclosure of the above application is incorporated herein by reference.

FIELD OF THE INVENTION

The present invention is related to a device which secures a spring to a vehicle for use in suspension systems for trucks, buses and the like. More particularly, the present invention is related to an improved bushing design which interfaces between a leaf spring and the attachment point on the frame for the leaf spring.

BACKGROUND OF THE INVENTION

Truck and bus suspensions are commonly designed using a pair of leaf springs between both the front and rear axles of the vehicle (the unsprung portion) and the body of the vehicle (the sprung portion). The leaf springs are normally a plurality of arcuately shaped steel or composite leafs that are stacked together to form the leaf spring. The axle of the vehicle is normally secured to the approximate center of the arcuate leafs with the end of the leafs extending upwards. The upward end of the leafs are normally formed into a tubular section or eye which is adapted for receiving a spring pivot bushing. The spring pivot bushing usually consists of an outer metal housing which is pressed into the eye of the spring, a layer of elastomer positioned within the outer metal housing and an inner metal housing which extends through the center of the layer of elastomer. A bolt extends through the inner metal and secures the end of the leaf spring to the frame or sprung portion of the vehicle by mating with an appropriate bracket. As the vehicle travels, relative movement between the sprung and unsprung portions of the vehicle is accommodated by flexing of the leaf springs. The flexing of the leaf springs causes the ends of the leaf springs to pivot on both of the tubular sections or eyes which secure the leaf spring to the sprung portion of the vehicle.

The spring pivot bushings are used to facilitate this pivotal motion and to isolate the vehicle from shock. The layer of elastomer located between the inner and outer metal housings effectively isolates the sprung portion of the vehicle from the unsprung portion of the vehicle. In certain high load applications, the ends of the outer metal are curved over towards the inner metal in order to further encapsulate the layer of elastomer. The curving of the ends and thus the further encapsulating of the layer of elastomer improves the radial spring rate, it improves the axial spring rate, it improves the axial retention and it improves the durability of the bushing.

While these elastomer isolated pivot bushings have performed satisfactorily in the field, they are not without their problems. The various problems associated with these prior art pivot bushings include variations in the diameters of the spring ends and distortion of the cross section in the area where the pivot bushing is pressed into the spring ends. These manufacturing variations in the configuration of the spring end, often allow the bushing to slip out of the spring when the spring undergoes an axial load.

Also, in the higher load applications, it is not uncommon for the outer metal to split due to high loads. This splitting of the outer metal can be avoided by heat treating of the outer metal. However, the outer metal in the higher load applications must remain soft in order for it to be crimped over. Thus, with curled end bushings, the heat treatment of the entire bushing is not a possibility. Another option for improving the strength of the outer metal is to manufacture the outer metal from drawn over mandrel (DOM) tubing which is superior in strength. While this DOM tubing will increase the strength of the tubing, it also significantly increases the manufacturing costs associated with the pivot bushing.

Thus, the continued development of pivot bushings has been directed to the improvement of performance, strength and durability while minimizing the manufacturing costs associated with the pivot bushing.

SUMMARY OF THE INVENTION

The present invention provides the art with a pivot bushing which provides the improved performance of the double-ended crimped bushings while still allowing for the use of the lower cost drawn shell outer metal. The present invention includes a split outer metal having one end crimped toward the inner metal with the other end forming a radially outwardly extending flange. A separate stamping can be attached to the flanged end in order to provide the compression and restriction for the elastomer. The outer metal of the present invention can be manufactured from the lower cost drawn shell material and because of its split configuration which is oriented towards the scarf gap of the spring, high point load stresses are avoided because the split outer metal design allows for very small radial deflections of the outer metal.

Other advantages and objects of the present invention will become apparent to those skilled in the art from the subsequent detailed description, appended claims and drawings.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
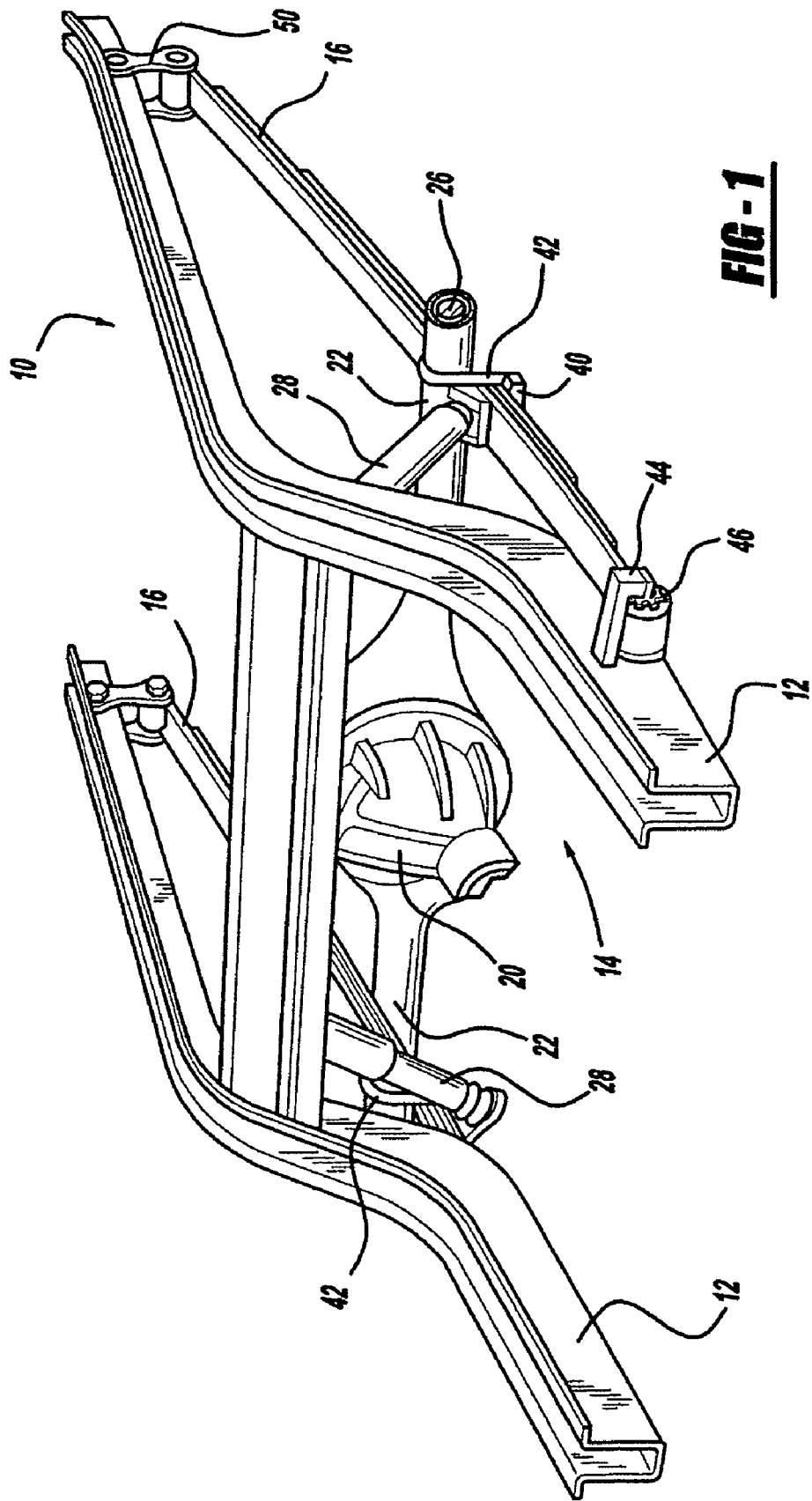
FIG. 1 is a typical rear suspension for a vehicle which incorporates the unique pivot bushing in accordance with the present invention.

Referring now to the drawings in which like reference numerals designate like or corresponding parts throughout the several views, there is shown in FIG. 1 a truck or bus rear suspension incorporating the unique bushing in accordance with the present invention and which is designated generally by the reference numeral 10. Rear suspension 10 comprises a frame 12, a drive axle 14 and a pair of springs 16. Frame 12 supports a body (not shown) and other components of the vehicle which are generally identified as the "sprung mass". Drive axle 14 includes a differential 20 which receives torque from an engine (not shown) through a rotating propeller shaft (not shown). Drive axle 14 also includes a pair of hollow tubes 22 that each extend out to a respective wheel assembly (not shown). Disposed within each of tubes 22 is a drive shaft 26 that extends to a hub (not shown) to which is attached a wheel (not shown). The engine transmits rotation and torque to differential 20 through the propeller shaft. Differential 20 transfers the rotation and torque from the propeller shaft to drive shafts 26 to rotate and thus drive the wheels of the vehicle. Springs 16 are disposed between frame 12 and drive axle 14 as will be discussed later herein. Additionally, a shock absorber 28 is disposed between each rail of frame 12 and drive axle 14 to dampen the motion between these two components. A torque rod (not shown) can be disposed between frame 12 and drive axle 14 to assist in the control of the motion of drive axle 14 with respect to frame 12.

Figure 2:
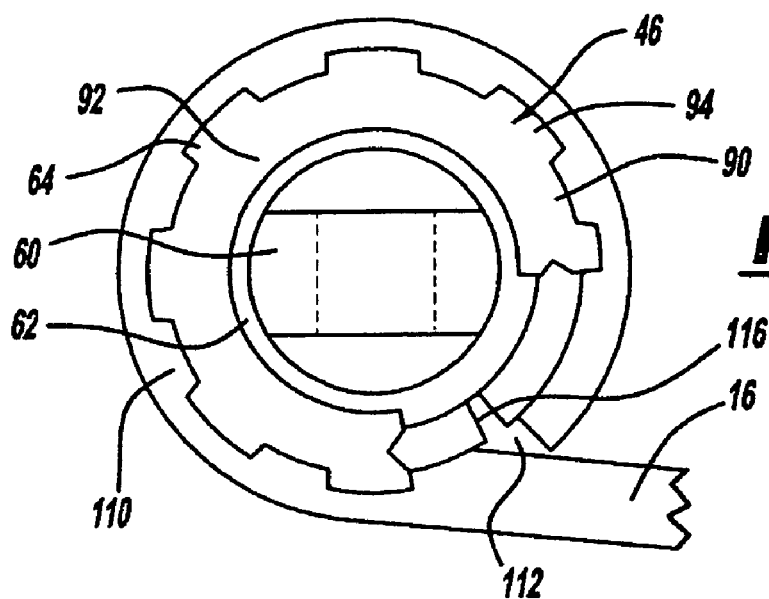
FIG. 2 is an enlarged end view showing the end of the leaf spring and the pivot bushing shown in FIG. 1.

Referring now to FIGS. 1 and 2, springs 16 are each attached to a respective tube 22 using a spring plate 40 and a pair of spring clips 42. The front loop of each spring 16 is attached to a bracket 44 attached to frame 12. A pivot bushing 46 is disposed between spring 16 and bracket 44 to accommodate motion between these two components and to isolate the vehicle from shock. The rear loop of each spring 16 is attached to a shackle 50 which is disposed between frame 12 and the rear loop of each spring 16. A pivot bushing 46 can be disposed between spring 16 and shackle 50 and a pivot bushing 46 can be disposed between shackle 50 and frame 12 to accommodate motion between these components and to isolate the vehicle from shock.

While the present invention is being illustrated as having only one pivot bushing 46 disposed between spring 16 and frame 12, it is within the scope of the present invention to have two or possibly three or more pivot bushings disposed between spring 16 and frame 12 if desired. In addition, while the present invention is being described as possibly having three identical pivot bushings 46 disposed between spring 16 and frame 12, it is within the scope of the present invention to use a different design for each bushing position if desired. Finally, while the present invention is being illustrated as having shackle 50 disposed between the rear loop of spring 16 and frame 12, it is within the scope of the present invention to have shackle 50 disposed between the front loop of spring 16 and frame 12 or between both the front and rear loops of spring 16 and frame 12 if desired.

Figure 3:
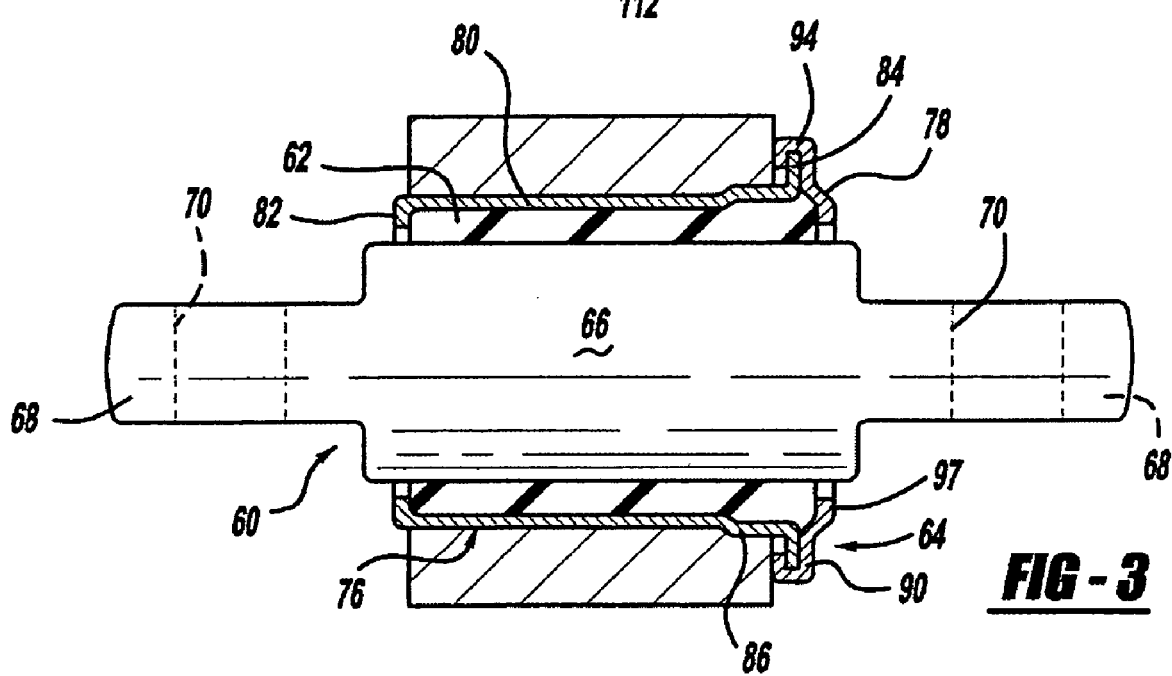
FIG. 3 is a cross-sectional view of the pivot bushing shown in FIG. 1.
Figure 4:
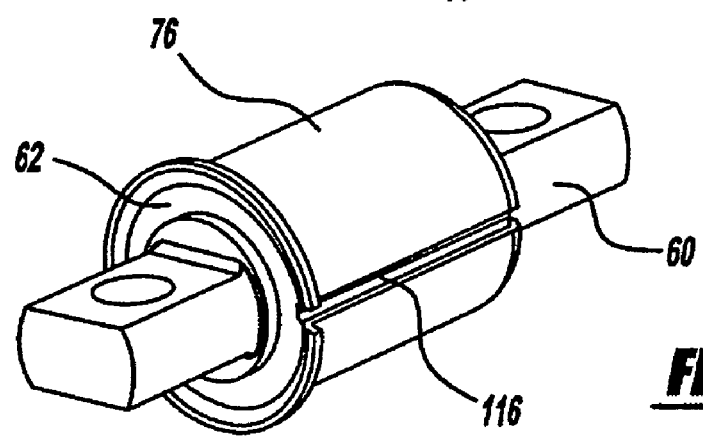
FIG. 4 is a perspective view of the pivot bushing shown in FIG. 1 without the cover.

Referring now to FIGS. 2 and 3, pivot bushing 46 comprises an inner metal 60, an elastomeric bushing 62 and an outer metal assembly 64. Inner metal 60 includes a generally cylindrical center section 66 and a pair of generally rectangular sections 68, one section 68 being disposed at each end of center section 66. Each rectangular section 68 has an aperture 70 extending through it which is used to secure pivot bushing 46 to the appropriate bracket. While center section 66 is illustrated as a solid generally cylindrical section, it is within the scope of the present invention to utilize a tubular inner metal design, a ball shaped pin or any other design, if desired. If a tubular inner metal is used, generally rectangular sections 68 can be eliminated and a through bolt can be used to secure the pivot bushing to the frame.

Elastomeric bushing 62 is an annular member which is located between inner metal 60 and outer metal assembly 64. The free diameter of elastomeric bushing 62 is larger than the space between inner metal 60 and outer metal assembly 64 such that a specified percent compression is applied to elastomeric bushing 62 when assembled into pivot bushing 46. The assembly of pivot bushing 46 can be accomplished by first bonding elastomeric bushing 62 to inner metal 60 and then inserting this combination into outer metal assembly 64. Another method of assembling pivot bushing 46 would be to first bond elastomeric bushing within outer metal assembly 64 and then inserting inner metal 60 within elastomeric bushing 62 if desired. The present invention provides advantage to both methods of assembly. Elastomeric bushing can be bonded to either inner metal 60 or outer metal assembly 64, it can be bonded to both inner metal 60 and outer metal assembly 64 or it can not be bonded to inner metal 60 or outer metal assembly 64.

Outer metal assembly 64 comprises a split cup shaped body 76 and a cover 78. Split cup shaped body 76 includes a split annular wall 80 which has an inwardly curved portion 82 at one end and an outwardly extending flange 84 at the opposite end. Split annular wall 80 can also include an optional stepped portion 86 in order to compensate for spring distortion. Split cup shaped body 76 is assembled over elastomeric bushing 62. Because flange 84 extends outwardly, elastomeric bushing 62 can always be assembled from this flanged end. Thus, inwardly curved portion 82 and outwardly extending flange 84 can be formed prior to the assembly of split cup shaped body 76 and elastomeric bushing 62. This, therefore, provides the opportunity to heat treat and thus strengthen split cup shaped body 76 prior to being assembled with elastomeric bushing 62.

Figure 5:
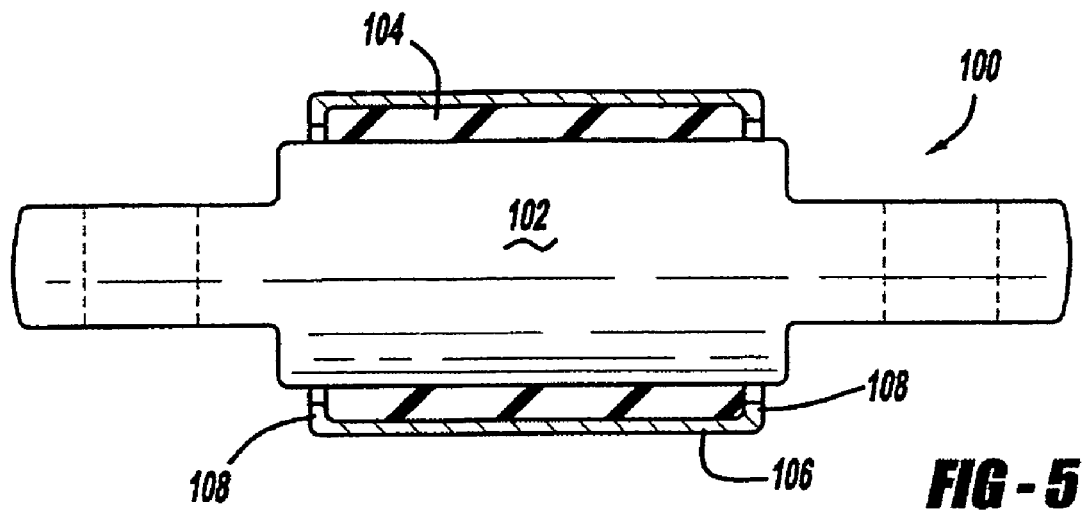
FIG. 5 is a cross-sectional view of a prior art high load pivot bushing.

In order to increase the strength of pivot bushing 46 for use in high load applications, elastomeric bushing 62 must be further encapsulated or restrained. Elastomeric bushing 62 is a generally non-compressible fluid. Thus, by encapsulating elastomeric bushing 62 further, the spring rate and thus the load supporting characteristics of pivot bushing 46 are increased. The prior art method for encapsulating the elastomeric bushing is shown in FIG. 5 which illustrates a prior art bushing 100. Bushing 100 includes an inner metal 102, an annular elastomeric bushing 104 and an outer metal 106. As can be seen in FIG. 5, elastomeric bushing 104 is further encapsulated by having an inwardly curved portion 108 located at both ends of outer metal 106. While this formation of two curved portions 108 effectively encapsulates elastomeric bushing 104, the formation of these curved portions 108 can only be accomplished by forming them after assembly with elastomeric bushing 104. If curved portions 108 are formed prior to assembly with elastomeric bushing 104, the assembly of the two components is extremely difficult if not impossible. Thus, it is not possible to effectively heat treat outer metal 106 prior to assembly with elastomeric bushing 104 since it must remain soft or ductile for the formation of curved portions 108. Also it is not possible to effectively heat treat outer metal 106 after assembly due to the deterioration of elastomeric bushing 104.

Referring back to FIGS. 2 and 3, the present invention overcomes this handicap with the prior art by using split cup shaped body 76 and cover 78. As stated above, the flanged end of split cup shaped body 76 always allows the assembly of split cup shaped body 76 and elastomeric bushing 62. Once these two components are assembled, cover 78 is secured to cup shaped body 76 to complete the encapsulation of elastomeric bushing 62.

Cover 78 is an annular member having a ring portion 90, a contoured portion 92 and a plurality of radially outwardly extending crimp portions 94. Ring portion 90 is disposed adjacent flange 84 and crimp portions 94 are bent around flange 84 as shown in FIG. 3 to secure cover 78 to cup shaped body 76. Contoured portion 92 provides the mating surface to elastomeric bushing 62 and thus will control the spring rate for pivot bushing 46 by controlling the encapsulation and the flow of elastomeric bushing 62. Another advantage associated with pivot bushing 46 is that pivot bushing 46 will limit axial motion of pivot bushing 46 with respect to spring 16 in one direction due to flange 84 and cover 78. Because the axial loading for a pivot bushing is significantly higher in one direction, pivot bushing 46 can be assembled to spring 16 in the appropriate direction such that flange 84 and cover 78 resist the significantly higher axial loading.

In certain high load applications, the tubular or non-split outer metal bushings are subject to fatigue failures of the outer metal due to high point load stresses. The configuration for the looped end or eyes of the spring within which the bushings are assembled into can be distorted, out of round shape an/or not fully circumferential. In these cases, the outer metal will fatigue due to high point load stress caused by the eye shape. For instance, in the manufacturing of a wrapped steel spring, the steel is wrapped in a coil to form an opening or eye 110 (see FIG. 2) in which the pivot bushing 46 is inserted into via interference fit. It is between the end of the steel wrap and the lower end of the spring that leaves an opening 112 in which the spring eye 110 does not complete a full circumference. Opening 112 is commonly referred to as a scarf gap. Typically, opening 112 or the scarf gap is located in the vertical plane of the vehicle. Both static and dynamic loads are transferred through the vertical plane of the vehicle. While opening 112 or the scarf gap is typically located in the vertical plane, opening 112 is not limited to the vertical plane and opening 112 can be located at other positions with respect to the vehicle such as, but not limited to, the longitudinal or lateral plane of the vehicle.

When a non-split tubular bushing is inserted into spring eye 110, scarf gap 112 creates point contact along a line where spring eye 110 does not support the outer metal. It is these point contacts, typically in the vertical plane, which subject the non-split tubular bushing to high load stresses and causes longitudinal fatigue cracks on the non-split outer metal.

Split cup shaped body 76 is designed to withstand the high load stresses applied by the point loading of spring eye 110. Split cup shaped body 76 includes a longitudinal split 116 which will allow for very small radial deflections of split cup shaped body 76 to reduce and/or eliminate the stresses for split cup shaped body 76. As shown in FIG. 2, split 116 is designed to be oriented in relation to scarf gap 112 in wrapped spring eye 110. In addition, the orientation of split 116 can be positioned in other areas deemed necessary in other spring eyes or in other applications using pivot bushing 46.

While split cup shaped body 76 is illustrated having a single longitudinal split 116, it is within the scope of the present invention to include a plurality of splits 116 as deemed necessary for the particular application. In addition, split 116 does not necessarily have to be a straight longitudinal split, it could also be toggled or it could even be circumferential depending on the given application.

Figure 6:
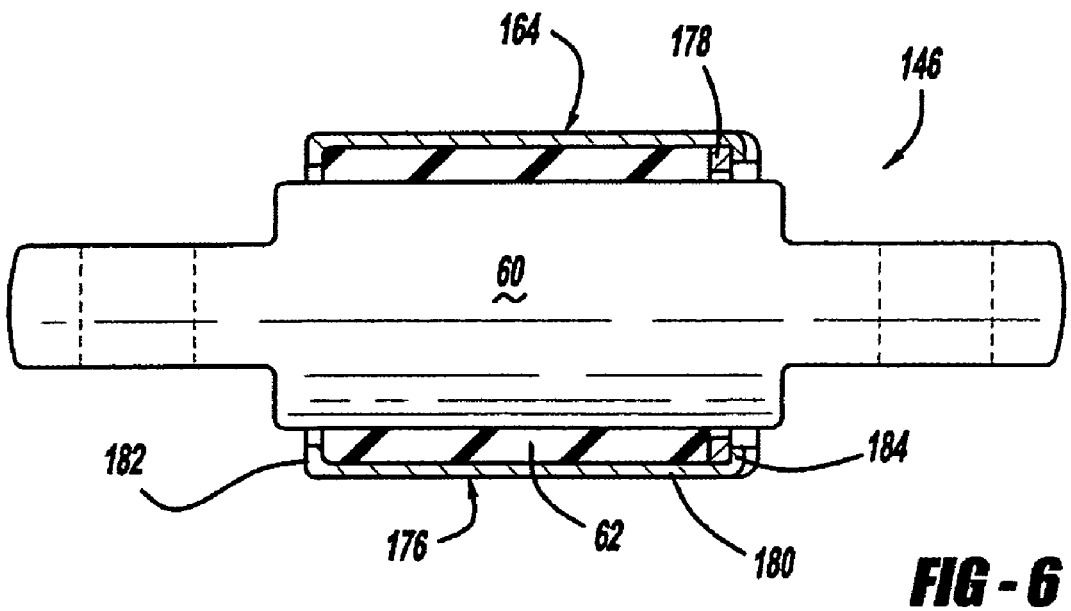
FIG. 6 is a cross-sectional view of a pivot bushing in accordance with another embodiment of the present invention.
Figure 7:
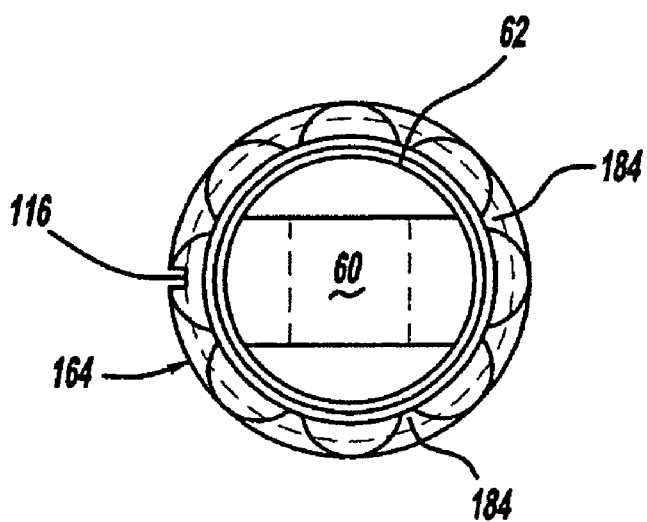
FIG. 7 is an end view of the pivot bushing shown in FIG. 6.

In certain applications it is desirable to utilize a flangeless design for the pivot bushing. FIGS. 6 and 7 illustrate a pivot bushing 146 in accordance with another embodiment of the present invention. Pivot bushing 146 comprises inner metal 60, elastomeric bushing 62 and an outer metal assembly 164. Thus, pivot bushing 146 is the same as pivot bushing 46 except that outer metal assembly 64 is replaced with outer metal assembly 164.

Outer metal assembly 164 comprises a split cup shaped body 176 and a cover or retaining ring 178. Split cup shaped body 176 includes split 116 and an annular wall 180 which has an inwardly curved portion 182 at one end. Split cup shaped body 176 is assembled over elastomeric bushing 62. Because the end of split cup shaped body 176 opposite to inwardly curved portion 182 is generally straight and open, elastomeric bushing 62 can always be assembled from this open end. Thus, inwardly curved portion 182 can be formed prior to the assembly of split cup shaped body 176 and elastomeric bushing 62. This, therefore, provides the opportunity to heat treat and thus strengthen split cup shaped body 176 prior to being assembled with elastomeric bushing 62.

Once split cup shaped body 176 and elastomeric bushing 62 are assembled, retaining ring 178 is inserted into the open end of split cup shaped body 176 adjacent elastomeric bushing 62 and the open end of split cup shaped body 176 is crimped or deformed in a plurality of places 184 to secure retaining ring 178 within split cup shaped body 176. Retaining ring 178 provides the mating surface to elastomeric bushing 62 and thus will control the spring rate for pivot bushing 46 by controlling the encapsulation and the flow of elastomeric bushing 62.

This design only requires split cup shaped body 176 to be crimped or deformed at a plurality of places 184. The open end of split cup shaped body 176 is not required to form a contour similar to that of inwardly curved portion 182. Retaining ring 178 forms the contour similar to portion 92. Thus the demand for a soft and ductile end which would require the open end of split cup shaped body 176 to not be heat treated is not present in this design. The open end of split cup shaped body 176 only needs to be soft or ductile enough to be crimped or deformed to retain retaining ring 178. The discussion above regarding split 116, its advantages and its various configurations also apply to pivot bushing 146.

While the above detailed description describes the preferred embodiment of the present invention, it should be understood that the present invention is susceptible to modification, variation and alteration without deviating from the scope and fair meaning of the subjoined claims.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A pivot bushing comprising:
   an inner metal;
   an outer metal disposed over the inner metal, the outer metal defining a split;
   an elastomeric bushing disposed between the inner and the split outer metal; and
   a spring eye surrounding the outer metal, the spring eye defining a scarf gap, the split in the outer metal being oriented in a predetermined position in relation to the scarf gap, wherein the split in the outer metal is aligned with the scarf gap.

2. The pivot bushing according to claim 1, wherein the outer metal has an inwardly curved portion at a first end and a generally cylindrical portion extending from the first end to a second open end, the open end being equal to or larger in diameter than the generally cylindrical portion.

3. The pivot bushing according to claim 2, wherein the split extends through the first end and the generally cylindrical portion.

4. The pivot bushing according to claim 2, further comprising a cover secured to the outer metal to close the second open end.

5. The pivot bushing according to claim 4, wherein the cover is disposed within the outer metal.

6. The pivot bushing according to claim 5, wherein the cover is secured to the outer metal by a crimp formed in the outer metal.

7. The pivot bushing according to claim 1, wherein the split extends over a longitudinal length of the outer metal.

8. The pivot bushing according to claim 1, further comprising a cover secured to the outer metal.

9. The pivot bushing according to claim 1, wherein the open end defines an outwardly extending flange.

10. The pivot bushing according to claim 9, wherein a cover is disposed adjacent the outwardly extending flange.

11. The pivot bushing according to claim 10, wherein the cover comprises a ring portion disposed adjacent the flange and a crimp portion securing the cover to the flange.

12. The pivot bushing according to claim 11, wherein the cover includes a contoured portion for closing an open end of the outer metal.

13. The pivot bushing according to claim 9, wherein the split extends through the outwardly extending flange.

14. The pivot bushing according to claim 9, wherein the outer metal has an inwardly extending portion at a first end and the outwardly extending flange at a second open end, a generally cylindrical portion extending from the first end to the second end, the second open end being equal to or larger in diameter than the generally cylindrical portion.

15. The pivot bushing according to claim 14, wherein the split extends through the first end, through the generally cylindrical portion and through the outwardly extending flange.

16. The pivot bushing according to claim 14, wherein a cover is disposed adjacent the outwardly extending flange.

17. The pivot bushing according to claim 16, wherein the cover comprises a ring portion disposed adjacent the flange and a crimp portion securing the cover to the flange.

18. The pivot bushing according to claim 17, wherein the cover includes a contoured portion for closing an open end of the outer metal.

* * * * *